May 12, 1959 R. M. SHAVER ET AL 2,885,971
RAILWAY FREIGHT CAR CORNER CAP
Filed Feb. 8, 1956 2 Sheets-Sheet 2
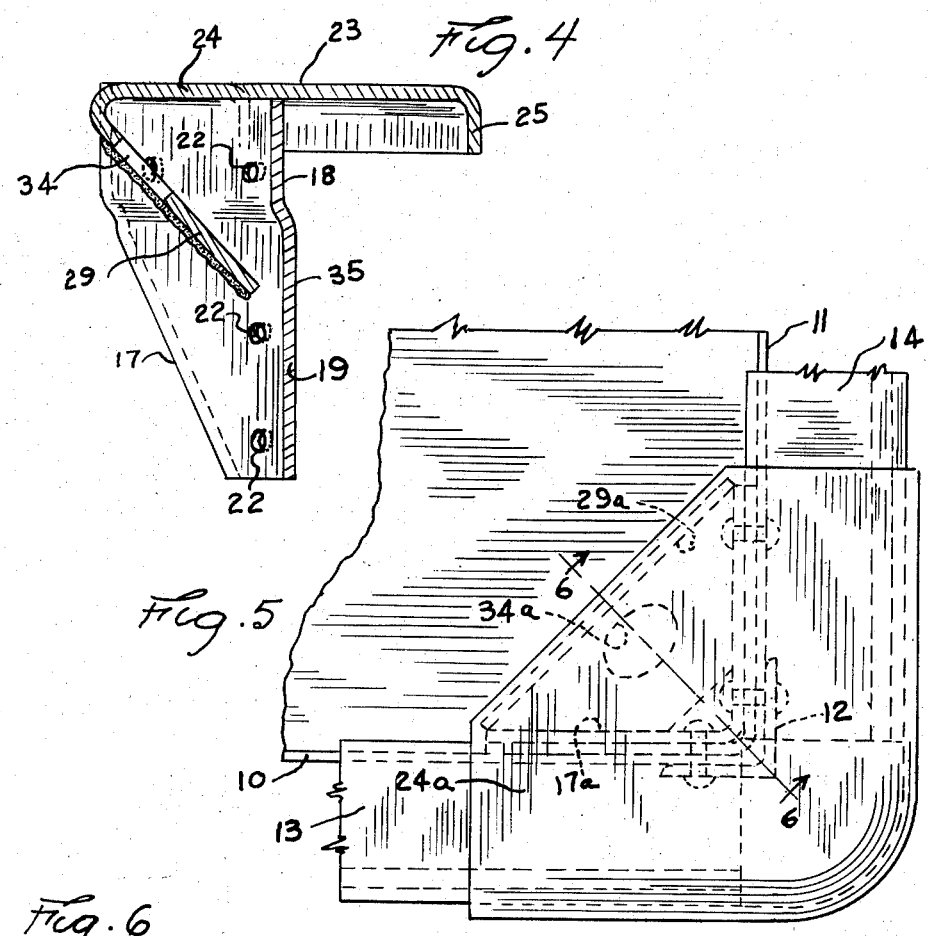
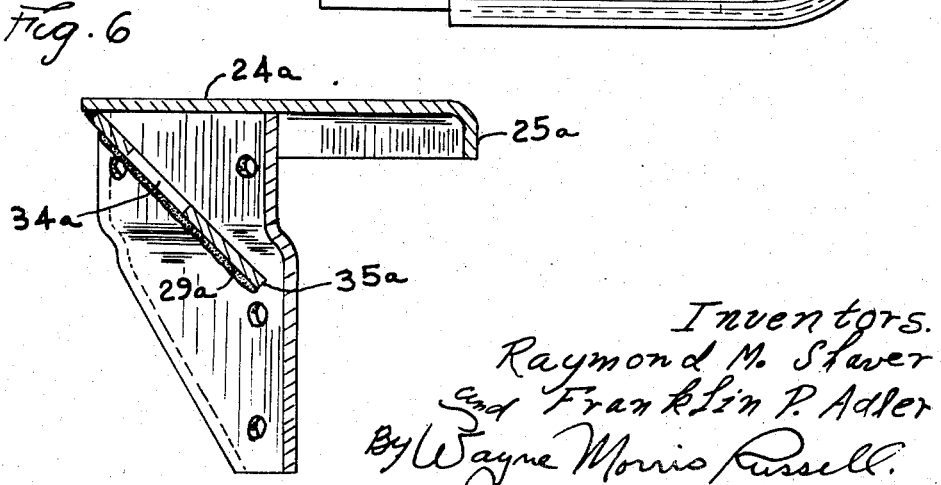
Inventors.
Raymond M. Shaver
and Franklin P. Adler
By Wayne Morris Russell
Attorney United States Patent Office 2,885,971
Patented May 12, 1959

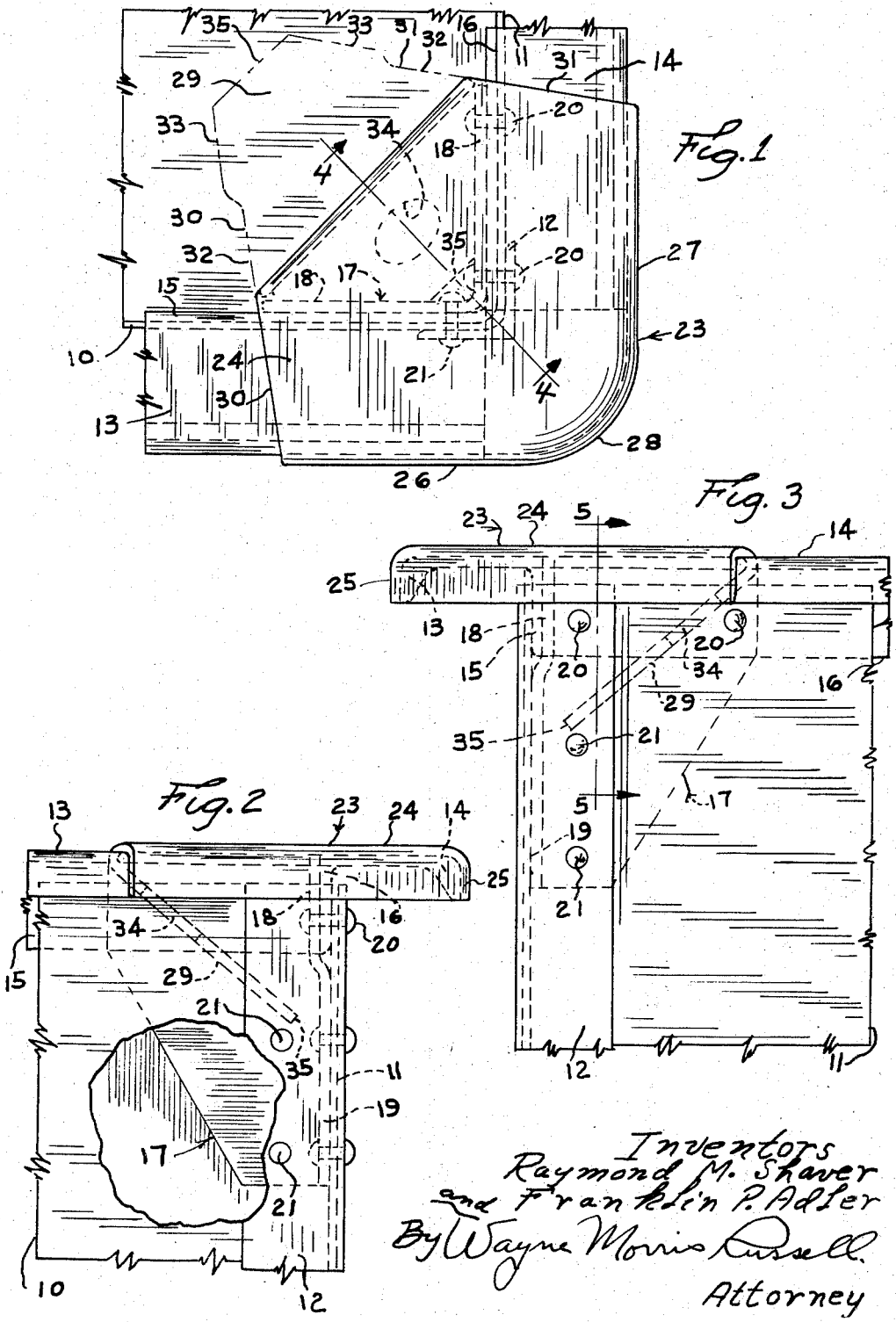

2,885,971

RAILWAY FREIGHT CAR CORNER CAP

Raymond M. Shaver and Franklin P. Adler, Michigan City, Ind., assignors to Pullman-Standard Car Manufacturing Company, Chicago, Ill., a corporation of Delaware Application February 8, 1956, Serial No. 564,210

2 Claims. (Cl. 105—406)

This invention relates to open top freight vehicles and has particular reference to the construction of corner caps for such vehicles.

The corner structure, and particularly the connection at the top of the side and end walls of open top freight cars, is subject to heavy stresses due to the inertia of the load upon the walls when the car is in operation in a train. These stresses create a tendency for the end to bulge outwardly and the side walls to be drawn inwardly, especially at the top of the car. This deflection and deformation tends to weaken the vehicle structure and consequently shortens the useful life of the vehicle.

Another objection to prior corner caps is that they overhang the right angle corner where the side and end walls meet, forming a definite pocket. For structural purposes, the overhang is desirable. However, it provides a place where loading equipment may catch, causing damage to the corner cap and car structure, and, also, provides a pocket at each corner of the car which will trap and hold portions of the lading when the vehicle is inverted in a car dumper to unload.

It is the principal object of this invention to provide a structurally improved corner map means for connecting the side and end wall corner portions of open top freight vehicles.

It is another and important object of the invention to provide corner cap means for connecting the side and end walls which prevent loading equipment from catching at the corner and any portions of the lading from being trapped in the corner when the vehicle is inverted.

Other objects and advantages of the invention will appear in greater detail hereinafter and the foregoing and other objects are attained by the corner cap structure of this invention.

The corner cap structure includes reinforcing plate means secured to the inner faces of the side and end walls and the respective top chord members adjacent the juncture of these elements and flanged means extending over the corner formed by the side and end top chord members secured to the reinforcing plate means. This forms a bracket enclosing the chord members so that the ends of these members and the side and end walls may be held in position. Plate means are provided extending at an angle from the diagonal edge of the flanged means to the reinforcing plate means, thereby closing off the right angle corner formed by the side and end walls and the flanged means. This provides a right angled trihedral corner.

Fig. 1 is a fragmentary plan view of the side and end wall corner of an open top railway freight car embodying this invention;

Fig. 2 is a fragmentary side elevational view of the railway freight car corner with the portion of the side wall and corner post broken away;

Fig. 3 is a fragmentary end elevation of the corner;

Fig. 4 is a sectional view taken on the line 4—4 of Fig. 1, showing the corner cap apart from the car;

Fig. 5 is a fragmentary plan view of a side and end wall corner of an open top freight car, showing a corner cap comprising a modified form of the invention; and Fig. 6 is a sectional view taken on the line 6—6 of Fig. 5 through the corner cap and also shows the corner cap apart from the car.

As shown in the drawings, there is indicated a fragmentary portion of an open top freight car, including a side wall 10, an end wall 11 and a corner post 12 joining the side and end walls. A top chord member 13 in the form of a bulb angle surmounts the side wall, and a top chord member 14, also in the form of a bulb angle, is mounted on the end wall and these top chord members are each secured to the inside surface of the walls 10 and 11, respectively, by means of inner flanges 15 and 16, depending from the respective chord members 13 and 14. For the purpose of reinforcing the junction of the side and end walls 10 and 11 and the respective top chord members 13 and 14, an angle-shaped reinforcing plate 17 is secured at the corner formed by these members. The plate 17 consists of two sides at substantially right angles and each of which has an upper portion 18 and a lower portion 19. The upper portions 18 are contiguous with the inner surfaces of the chord member inner flanges 15 and 16, to which they are secured by rivets 20, and the lower portions 19 being offset outwardly from the upper portions 18 are contiguous with and secured to the side and end walls 10 and 11, respectively, by rivets 21 (Figs. 2 and 3), the rivets 20 and 21, extending through rivet holes 22, formed in the sides of plate 17. The upper edge of the plate 17 is disposed flush with the upper edges of the top chord members 13 and 14.

The top cover member 23 of the corner cap is comprised of an originally flat, generally diamond-shaped plate 24. A flange 25 is formed along the two adjacent outer sides 26 and 27 of the plate 24 and the corner 28 therebetween is rounded. The inside corner portion 29, opposite the rounded corner 28, between the sides 26 and 27, is bent downwardly at a point intermediate the length of each of the other two sides 30 and 31 and inclined toward the plate portion 17. The flange 25 is bent at approximately right angles to the plate 24 whereas the corner portion 29 is bent toward the flange 25 at an acute angle to the plate 24.

By this arrangement, when the corner cap 23 is located over the corner formed by the top chord members 13 and 14, the vertically depending flange 25 is contiguous with the outer surfaces of the bulb angle members 13 and 14, thereby forming with the reinforcing plate 17 a bracket enclosing the top chord members. The angularly depending corner portion 29 is so arranged that, when bent inwardly, the edges 32—32 will contact and be secured by welding to the upper portions 18 of the reinforcing plate 17 and the outwardly projecting edges 33—33 of the corner plate portion 29 will contact and be secured by welding to the lower portions 19 of the reinforcing plate. By covering the three-sided inside right angle corner formed by the walls 10 and 11, the chord members 13 and 14, and the corner plate 24, the sloping corner portion 29 provides an obtuse angled corner in which loading equipment can not catch. It is to be noted that the corner portion 29 could be separate, rather than integral, with the corner cap plate 24, whereby it would be welded thereto along the diagonal edge extending between the sides 30 and 31. A construction of this type is shown in Figs. 5 and 6.

In order that riveting equipment may be used in the corner, an opening 34 is formed in the corner plate portion 29, thereby allowing the insertion of such equipment. The opening may allow certain types of lading, such as granular materials, to get into the space formed by the corner portion 29 and the reinforcing plate 17 when the car is inverted in a dumping machine, but the innermost end of the plate 29 does not contact the reinforcing plate 17, thus forming an opening 35 through which the material may drain when the car is righted.

As shown in Figs. 5 and 6, the corner cap may be assembled from separate parts comprising the cap plate 24a, reinforcing plate 17a of angle section, and an inclined corner plate 29a. The cap plate is flanged at 25 as in the previous embodiment and is integrated with the angle reinforcing plate by welding as before. The inclined plate 29a also is secured by welding between the diagonal inner edge of the cap plate 24a and the respective angular portions of the reinforcing plate 17a and is provided with opening 34a and drain opening 35a. The application of this corner cap to the vehicle structure is the same as the previously described cap and the modified structure similarly functions to brace and reinforce the corner of the vehicle and prevent anything from being caught under the cap and permits drainage of the granular materials.

From the foregoing, it will be seen that an improved corner cap arrangement of greater strength has been provided for open top freight vehicles and which eliminates the possibility of loading equipment catching on the cap or any portion of the lading being caught by the cap when the vehicle is inverted.

What is claimed is:

1. In a freight vehicle including a side wall, an end wall, a corner post securing side and end walls together, and a top chord secured to and extending over each wall, a corner cap comprising an angle shaped vertically disposed reinforcing member having flanges secured respectively to said side and end walls adjacent the top thereof and a horizontal cover member secured at the top edges of said flanges and extending over and diagonally between said chords and secured to the chords, said cover member forming a right angle trihedral corner with said reinforcing member, and plate means substantially covering said corner extending angularly downward from said cover member to said reinforcing member and secured to both said members.

2. A corner cap for an open top freight vehicle comprising an angle shaped vertically disposed reinforcing member having right angle flanges, a horizontal cover member overlying the top edges of said flanges and secured thereto and forming a right angle trihedral corner with said flanges, said cover member having a diagonal edge extending across said corner between said flanges, and plate means depending angularly from said diagonal edge toward said flanges and secured to both of the flanges, said cover member having horizontal bracket portions outwardly of said flanges adapted to overlie portions of said vehicle.

References Cited in the file of this patent
UNITED STATES PATENTS

| | | |
|---|---|---|
| 891,466 | Dewey | June 23, 1908 |
| 1,177,829 | Streib | Apr. 4, 1916 |
| 1,234,516 | Wege | July 24, 1917 |
| 1,939,931 | Tangerman | Dec. 19, 1933 |

FOREIGN PATENTS

| | | |
|---|---|---|
| 1,041,470 | France | May 27, 1953 |